Patented May 6, 1941

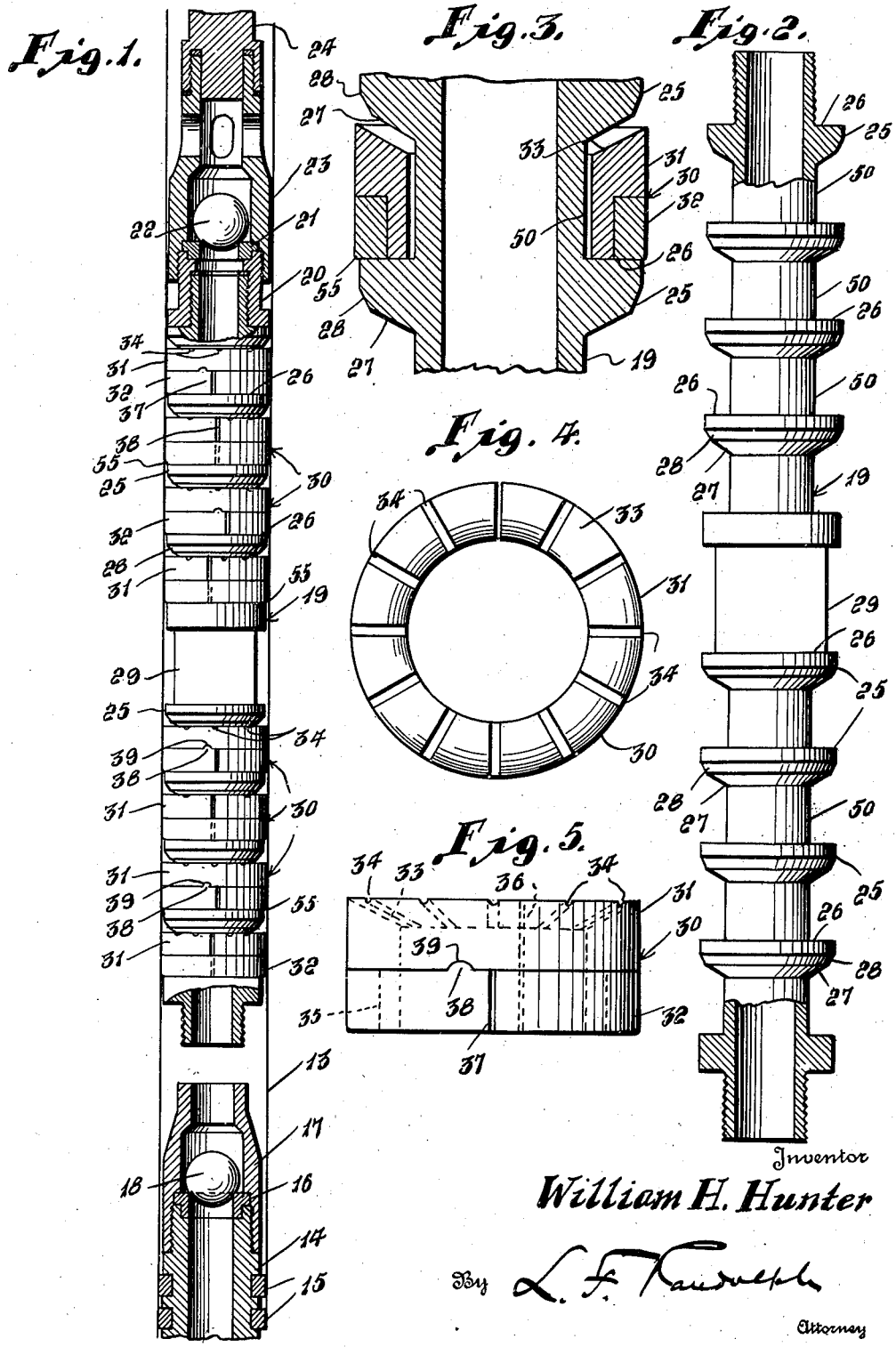

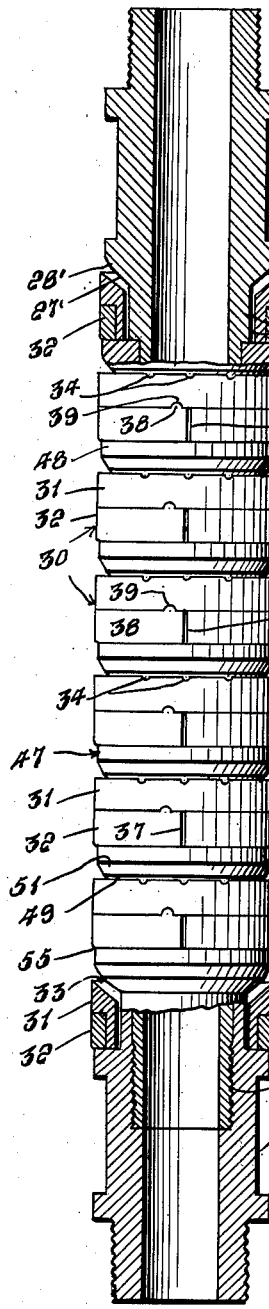

2,240,780

UNITED STATES PATENT OFFICE 2,240,780

FLAT GROOVE VALVE BODY AND PACKING MEANS THEREFOR

William H. Hunter, Findlay, Ohio, assignor to W. H. Hunter Engineering Co., a corporation of Michigan Application January 5, 1939, Serial No. 249,497

2 Claims. (Cl. 103—225)

This invention relates to an improved working barrel valve body for reciprocating liquid pumps provided with an improved spaced groove construction adapted to receive an improved form of packing ring.

It is an object of this invention to provide an improved pump plunger or working barrel valve body for use with various types of hydraulic plunger pumps, and provided with improved packing means which will be effected to automatically compensate for wear and which may be expeditiously applied to or removed from the plunger body.

More particularly, it is an aim of this invention to provide a pump plunger having packing rings adapted to be expanded by the column of liquid within a working barrel or pump tubing during the upward movement of the plunger for supporting and raising said liquid column and means whereby said packing may retract during the downward movement of the plunger to eliminate unnecessary wear on the packing members.

Still another object of the invention is to provide a packing ring having means whereby the dirt, sand or other sediment will be washed from the space between the valve body and ring by the liquid being pumped during the downward movement of the valve body.

It is therefore a salient object of this invention to provide a working barrel valve body or pump plunger that may be economically manufactured of a durable and simple construction capable of being quickly assembled and disassembled and provided with improved packing means.

Other objects and advantages of the invention will hereinafter become more fully apparent from the following description of the drawings, which illustrate a preferred embodiment thereof, and wherein:

Figure 1 is an elevational view partly in vertical section showing the improved working barrel valve body or plunger disposed in a working barrel provided with a standing valve, Figure 2 is a similar view of the plunger or valve body with the packing rings removed, Figure 3 is an enlarged fragmentary vertical central sectional view showing one of the packing grooves with a packing ring disposed therein, Figure 4 is a top plan view of the packing ring, Figure 5 is a side elevational view of the same, Figure 6 is a side elevational view partly in vertical section showing another form of the barrel valve body or plunger, Figure 7 is a view similar to Figure 6 showing the plunger with the packing rings removed, Figure 8 is a side elevational view of one of the sleeve members, Figure 9 is a side elevational view of one section of the packing ring, Figure 10 is a similar view of the other section thereof, and Figure 11 is a side elevational view of a slightly modified form of the packing ring, showing the two sections separated.

Referring more particularly to the drawings, wherein like reference characters designate like or corresponding parts throughout the different views, 13 designates generally a pump working barrel in the lower end of which is mounted a stationary valve seat support 14 provided with the sealing rings 15, and with a removable valve seat 16 at its top which is held in place by the removable cage 17 which limits the movement of the ball valve 18 relatively to its seat 16.

The working barrel valve body or plunger, designated generally 19, is threaded at its upper end to receive the valve seat support 20 in which is removably mounted the valve seat 21 to receive the ball valve 22 the movement of which is limited by the cage 23 which is connected to the threaded exterior of the support 20 and which retains the valve seat 21 in position.

Cage 23 has a threaded shank at its upper end by means of which it is adapted to be connected to a sucker rod 24. Body 19 is tubular in cross section, and as best seen in Figures 3 and 2 is provided with a plurality of spaced annular shoulders 25 forming therebetween the grooves 50. Shoulders 25 have the flat top surfaces 26 and are each provided with the two annular beveled portions 27 and 28 on their undersides, for a purpose which will hereinafter be described.

Body 19 may be provided with the enlarged portion 29, the outer periphery of which is polygonal in cross section, to form a wrench receiving surface for turning the body member 29 to disconnect the cage 23 and other removable parts connected thereto.

Referring now to Figures 4, 5, 9 and 10 the improved packing ring designated generally 30, and adapted for use with the plunger 19 is shown, constructed of the two sections 31 and 32. The section 31 is annular in shape and is provided with a beveled inwardly extending top portion 33 in which is provided a plurality of radially disposed grooves 34, and is reduced on its outer side and at its bottom as indicated at 35. Section 31 is in the form of a ring split along the line 36. Section 32, as best seen in Figure 10, is likewise ring shaped and is split along the line 37 and is adapted to fit onto the reduced portion 35 so that its periphery will be substantially flush with the periphery of the top part of the section 31 and so that its bottom edge will be substantially flush with the bottom edge of the section 31, as best seen in Figure 5. Section 32 is provided with the upwardly projecting tit 38 adapted to engage the recess 39 in section 31 for interlocking said sections when assembled so that the split portions 36 and 37 will not be in communicating relationship. By thus interlocking the ring sections the ring 30 is formed having a solid lower portion.

In Figure 11 a slightly modified form of ring, designated generally 30', is shown wherein the section 31' is provided with an outwardly projecting tit or pin 40 in its reduced portion 35' to engage the opening formed by the arcuately shaped portions 41, in opposite sides of the split 37' of ring section 32', to interlock said sections with the split portions in non-communicating relationship. Ring 30', may be formed of metal, and may be used instead of ring 30 with plunger 19 or with the modified plunger hereinafter to be described.

A packing ring 30 is adapted to be mounted in each of the grooves 50, and as best seen in Figure 3, the inner circumference of the ring 30 is greater than the outer circumference of the plunger body 19 so that a space is formed between the plunger 19 and the interior of the ring 30. Ring 30 seats on the top surface 26 of the shoulder 25 and is of a height less than the grooves 50 so that its beveled top portion 33 will be spaced from the beveled underside 27 of the shoulders 25 forming an annular space therebetween communicating with the space between the ring 30 and the plunger 19.

In Figures 6 and 7, another form of the plunger or working barrel valve body, designated 42, is shown having a portion 29' adjacent its upper end to receive a wrench and provided at its bottom with a shoulder 43 provided on its underside with the beveled portions 27' and 28' and with the annular periphery 44 therebeneath. Plunger 42 below the portion 44 is reduced in circumference as indicated at 45, the lower end of portion 45 being exteriorly threaded as indicated at 46.

A plurality of sleeves, designated generally 47, are disposed one above the other on portion 45 of plunger 42. Sleeves 47 at their upper ends are provided with the collars or shoulders 48 having the beveled portions 49 and 51 on their undersides corresponding to portions 27' and 28' and having the flat top portions or seats 52 corresponding to the flat top portions or seats 26. The lower part of the sleeve 47 is of the same diameter and length as portion 44 so that said sleeves 47 when assembled one above the other on the plunger 42 combine to form shoulders 48 corresponding to shoulders 25 and grooves 53 corresponding to the grooves 50. A collar 54 is provided with an internally threaded end to engage the threaded portion 46 to engage and support the lower sleeve 47 which thereby supports the sleeves thereabove.

Packing rings 30 are similarly mounted in the grooves 53 of the plunger 42 between the shoulders 48 and if desired packing rings 30 and 30', which are formed of a flexible material, may be formed without the slots 36 and 37, 36' and 37', respectively, in which case the packing rings would be made of an elastic material which could be expanded.

From the foregoing it will be seen that a plunger 19 or 42 when fully assembled as seen in Figure 1, is adapted to be reciprocated in the working barrel 13 and functions on the well known principle that on the upward movement of the plunger the valve at the bottom of the working barrel, designated 18, will be opened upwardly by the suction formed in the space between the standing valve and the traveling valve to draw a liquid upwardly therethrough and on the down stroke of the plunger this liquid is forced up through the bore of the plunger and out through its valve at the top thereof so that on the next up stroke of the plunger the liquid thereabove will be lifted by said plunger. On the up stroke of the plunger 19 a portion of the liquid which is being supported by the plunger will move downwardly between the top of the plunger and the working barrel 13 and pass into the space between beveled portions 33 and 27 and into the grooves 50 behind the rings 30 to expand them into tight engagement with the barrel 13 to seal the space between the plunger and barrel. The pressure of the liquid on the beveled portions 33 of the rings 30, during the up stroke, will force the rings 30 downwardly to cause them to seat in sealing engagement on the flat portions 26 and will likewise cause the sections 32 to seat on the shoulders of the sections 31 formed by the reduced portions 35. Beveled portion 28 of each of the shoulders 25 is provided to better insure contact of the column of liquid above the plunger with the beveled faces 33 of the rings 30 so that said rings will be expanded by the liquid to prevent the upper edges of the portions 33 from turning inwardly and possibly sealing the top of the groove 50. During the downward movement of the plunger, rings 30 will be forced upwardly by frictional contact with the interior of the barrel 13, and into seating engagement with the portions 27. A portion of the liquid in the barrel 13 which passes upwardly on the outer side of the plunger 19 will pass into the grooves 50 between the top faces 26 of the shoulders 25 and the bottom edges of the rings 30, and upwardly on the inner sides of the rings to escape from the grooves 50 by passing outwardly and upwardly through the grooves 34 formed in the beveled faces 33. The liquid thus passing upwardly through the packing rings 30 will tend to clean out any dirt or sediment that may have collected therein and which would otherwise prevent the rings 30 from functioning as heretofore described. As best seen in Figure 3, the lower outer edge of the ring sections 32 and 32' are beveled as indicated at 55 so that the lower ends of the rings 30 may readily pass into the barrel 13 for assembling the pump.

The working barrel valve bodies 19 and 42 may be of any desired size and may be provided with any number of grooves 50 or 53, respectively. The packing rings 30 and 30' may be formed of any suitable material that is flexible and yieldable, including metal.

The working barrel valve bodies 19 and 42 are also adapted to be used in inverted working barrels by inverting the working barrel valve bodies 19 and 42 so that the beveled portions 27 and 28 of plunger 19 and the beveled portions 49 and 51 of the plunger 42, and the beveled portions of the packing rings will be subjected to the liquid column pressure which enters the working barrel at the bottom end thereof.

The number of grooves 50 or 53 and the number of rings 30 or 30' required to pump or lift a column of liquid will depend on the depth of the well or the head pressure. Each packing ring 30 or 30' will support a certain amount of the load and will be subject to a certain amount of leakage and for this reason a plurality of packing rings are provided so that each ring may take up a portion of the leakage from the ring above so that with a sufficient number of rings the leakage between the plunger and the working barrel on the pumping stroke may be eliminated.

Various modifications and changes in the construction and arrangement of the parts forming the invention are contemplated and may obviously be resorted to, and the right is therefore expressly reserved to make such variations and changes in the construction and arrangement of the parts forming the invention as do not depart from the spirit and scope of the invention as hereinafter defined by the appended claims.

I claim as my invention:

1. A pump plunger comprising an imperforate plunger body having a plurality of spaced annular shoulders forming grooves therebetween, said shoulders having flat top surfaces and inwardly and downwardly inclined undersides, expansible packing rings, mounted in said grooves, having flat bottom edges normally resting on the upper sides of said shoulders, said packing rings each being formed of split sections each in a single part extending approximately 360°, the spaces of the rings being of greater diameter than the portions of the body surrounded thereby whereby the inner sides of the rings are normally spaced from the bases of the grooves, the outer portions of the rings extending beyond the periphery of the shoulders, the top edges of the rings being inclined inwardly and downwardly and normally spaced from the undersides of the shoulders to form annular passages to the space behind the rings, for a liquid being pumped, whereby the liquid will expand the rings on the upstroke of the piston, the outer portions of the bottom edges of the rings forming abutments for the liquid, during the downward movement of the piston, to raise the rings to admit the liquid therebeneath to the grooves for flushing sand and sediment therefrom, and the inclined top edges of the rings having a multiplicity of substantially radial grooves forming outlet ports for the liquid when the rings are in a raised position.

2. A pump plunger comprising a cylindrical body having a plurality of removable sleeves having annular shoulders at their upper ends forming spaced grooves therebetween when said sleeves are assembled one above the other, said shoulders being provided with a plurality of annular beveled faces on their undersides, expansible packing rings each of one part and extending approximately 360° disposed in said grooves to normally seat on the tops of said shoulders, the inner diameter of said packing rings being greater than the outer diameter of the periphery of said sleeves, said packing rings being beveled inwardly at their tops and normally spaced from the beveled portions of said shoulders to form therewith annular inwardly and downwardly inclined passages adapted to receive a liquid during the upward movement of said plunger to direct the liquid into the spaces between the sleeves and packing rings for expanding the packing rings, the beveled portions of said packing rings being provided with a plurality of radially disposed grooves forming with the beveled portions of said shoulders, when the packing rings are in a raised position, passages whereby the liquid may pass upwardly between the packing rings and the periphery of the sleeves for carrying off sand, dirt and sediment.

WILLIAM H. HUNTER.